No. 826,517. PATENTED JULY 17, 1906.
W. MICHALK.
STEAM LUBRICATING APPARATUS.
APPLICATION FILED JAN. 7, 1905.
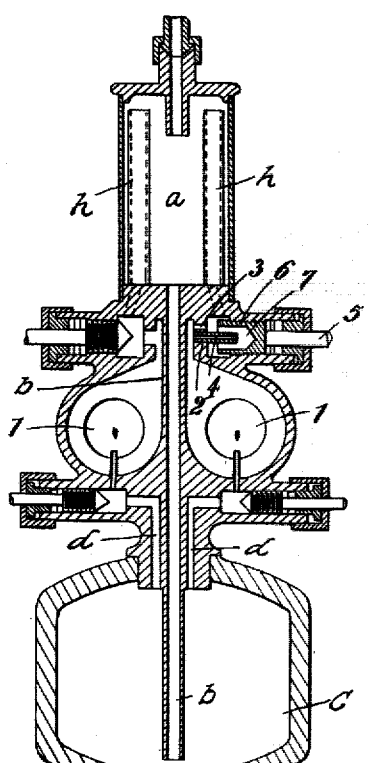
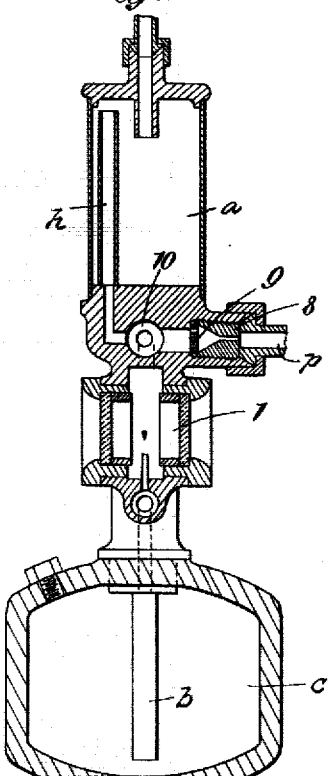
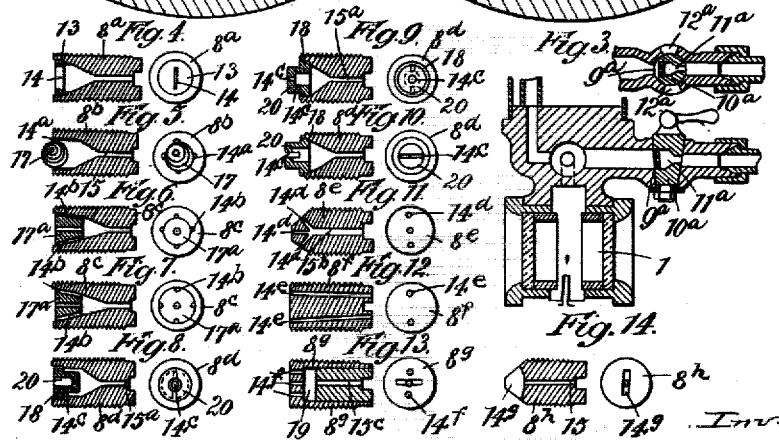
Witnesses:
P. M. Smith
G. V. Forbes
Inventor
Wilhelm Michalk
By D. P. Wolhaupter
Attorney

UNITED STATES PATENT OFFICE.

WILHELM MICHALK, OF DEUBEN, NEAR DRESDEN, GERMANY.

STEAM LUBRICATING APPARATUS.

No. 826,517.　　　Specification of Letters Patent.　　Patented July 17, 1906.

Application filed January 7, 1905. Serial No. 240,103.

*To all whom it may concern:*

Be it known that I, WILHELM MICHALK, a subject of the King of Saxony, and a resident of Deuben, near Dresden, in the Kingdom of Saxony, Germany, have invented certain new and useful Improvements in Steam Lubricating Apparatuses, of which the following is a full, clear, and exact description.

This invention relates to a steam lubricating apparatus for steam cylinders and valves of all kinds, in which the expulsion of the oil is operated by the water of condensation accumulating in the chambers of the same.

The task to be solved by the present invention is, on the one hand, to better insure a uniform distribution of the oil for the purpose of thoroughly mixing the oil and the steam and, on the other hand, to afford a relief of the passage leading from the glass chamber to the steam-pipe, and also to prevent the suction of the water from the glass chamber arising from sudden fluctuations in the pressure of the steam which varies in its speed.

This steam lubricating apparatus is shown in the accompanying drawings, Figures 1 and 2 being sections of it taken at right angles to one another. Fig. 3 is a vertical and horizontal section of a form of construction of an adjustably-arranged lattice-shaped oil-distributer in the steam and oil pipe. Figs. 4 to 10 show in sections and end views forms of construction of the oil-distributers arranged in the throttle-nozzles and the kind of narrow passages hereby formed. Figs. 11 to 14 are sections and end views of forms of construction of throttle-nozzles in which the narrow passages are directly arranged in these nozzles without the use of separate insertions.

The glass chamber 1 instead of, as hitherto, being connected with the steam-pipe by merely one passage 2 is connected by another passage 3, Fig. 1, placed higher than the passage 2, or by several such passages, so that thereby the passage 2 for the flow of the oil and water from the glass chamber 1 to the steam-pipe is relieved, the passage 2 having merely the object of serving for the running off of the oil and water, while the water of condensation formed in the upper convexity of the wall of the steam-chamber just above the passage 3, which again replaces the water carried off with the oil from the glass chamber 1, can pass by the passage 3 into the glass chamber. This warm water of condensation which is discharged into the glass chamber 1 through the passage 3, penetrating the surface-level of the oil, does not come in contact with the oil flowing off through the passage 2, so that a disintegration of the latter by boiling and an injury to its lubricating action is prevented and the water of condensation contained in the glass chamber is not rendered impure. It will thus be seen that the passage 2 can only serve for the flow of the oil and water out from the glass chamber and not for the introduction into the said chamber of the water of condensation formed in the steam-chamber 7, which water of condensation has to replace the water in the glass chamber which is carried off with the oil. Of course for that purpose only that water of condensation can be used which is formed in the upper convexity of the wall of the steam-chamber 7 just above the higher passage 3 and which runs downward to said passage, through which it flows into the glass chamber. Further, in order to prevent the water contained in the glass chamber 1 being drawn out of the chamber 1 by the action of the steam flowing through the apparatus, thus causing interruptions in the oil-supply, one or more of the passages 2 3 is or are prolonged by a tubular projection 4, which extends toward a tubular piece 6, closed at its rear end and preferably displaceable by means of a spindle 5, which piece 6 projects somewhat beyond the tubular projection 4. A chamber 7 is formed by means of this tubular piece 6, in which chamber the steam accumulating therein undergoes cooling and exerts a certain pressure against the passage 2, provided with the tubular projection 4, and also against the higher-placed passage 3, which pressure consequently neutralizes the suction action produced by the steam-passage on the water contained in the glass chamber, while not impeding the upward rising through the water and drawing off of the specifically lighter drops of oil. The tubular projection 4 also prevents impurities carried along on the walls of the steam-pipe from being forced into the glass chamber 1. A further object of the chamber 7, formed by the tubular piece, consists in that the cooled steam contained therein itself collects the oil entering the chamber and distributed therein without decomposition of the oil by heat having to be feared, as would be the case if the oil were directly introduced into the steam-passage itself through steam of a normal degree of heat. There thus takes place a perfect mixture of steam with undecomposed oil, which is transmitted to the jet of steam passing through the apparatus, as oil, as is well known, is very easily and rapidly distributed in steam. Thereby a perfect mixture of the steam with undecomposed oil takes place, while otherwise the oil would be decomposed by the steam which hinders the intended lubrication of the steam, and the residues of the decomposed oil form a sludge which stops up the passages.

In order to better insure the uniform mixture of the forced oil with the steam passing through the apparatus and to prevent a cooling of the oil by the water of condensation which has cooled and is contained in the pipe or passage, the oil-distribution is operated by means of a lattice-work, a perforated plate or the like 9, Fig. 2, inserted between the place where the steam and oil pipes meet, and a throttle-nozzle 8. This lattice, plate, or the like may preferably also be combined with the nozzle 8 in order to be able to be removed with the latter for the purpose of being cleaned. The oil passing from the meeting-place 10 of the steam and oil pipes does not come in contact with the wall of the part of the pipe situated in front of the lattice-work 9, arranged in immediate proximity to this meeting-place, but it strikes about the middle of the surface of the lattice and then runs along the bars of the same, so that it covers the entire lattice, and thus the steam, which by the action of the throttle-nozzle is under pressure, on flowing through the lattice-work encounters oil everywhere at the narrow passages of said lattice-work, and is thereby thoroughly mixed with the said oil. When the steam has once absorbed the oil, it no longer releases it, and there is therefore no fear that the oil will remain adhering to the walls of the wider passage or pipe without being caught along with the steam. In consequence of the mixture of the oil with the hot steam the oil can also exert its lubricating action in a heated condition without coming in contact with cooled water of condensation and having to undergo through this latter a cooling or any otherwise deleterious action.

From the foregoing it will be observed that the general operation of the lubricator may be briefly noted, as follows: $a$ designates the condenser, in which the steam received from the boiler is formed into water of condensation, which flows through the main central water-tube $b$ into the bottom oil-reservoir $c$. In the latter the water of condensation presses the oil through the oil-channels $d$ into the glass chamber 1. The said glass chamber is also filled with water of condensation formed in the steamways $h$, projecting into the condenser $a$ and in communication through suitable ports with the space above the oil-level of the glass chamber. Since the glass chamber is filled with water of condensation, the oil drop in ascending through the latter will be carried through the passage 2 into the steam-chamber 7 and thence discharge with the steam through the delivery-pipe $p$ in communication with the discharge-nozzle for the mixed steam and oil.

Fig. 3 shows in what manner the lattice-work, perforated plate, or the like, arranged between the meeting-place of the steam and oil passages and the throttle-nozzle, which acts as an oil-distributer, may also be adjustably arranged in order to enable it to be more easily cleaned. The lattice 9ª is attached to a body 10ª, resembling a cock-plug, in front of a perforation 11ª, lying in the direction of the passage of the mixture of oil and steam. In the wall of the oil and steam pipe two lateral apertures 12ª are provided. Should the lattice 9ª have become coated with sludge or the like, the plug-like body 10ª is merely turned a quarter-revolution, so that the perforation thereof stands transversely and communicates with the lateral apertures 12ª, whereupon the perforation, as well as the lattice-work located in front thereof, can be easily reached and blown through or otherwise easily and thoroughly cleaned. The adjustable body carrying the lattice-work may also be of other shape than that of a cock-plug—for instance, it may be formed as a slide.

Figs. 4 to 10 show other forms of construction of oil-distributers arranged between the meeting-place of the oil and steam pipes, and the throttle-nozzles which produce a certain compression of the steam or oil distributers arranged in combination therewith, which oil-distributers, in consequence of the narrow passages formed by them, also assist in producing a greater certainty of a uniform mixing of the oil with the steam.

In Fig. 4 a disk 13 is utilized for this, which is inserted in the throttle-nozzle 8ª at the end of the same facing the meeting-place of the oil and steam pipes. In this disk 13 a narrow slot 14 is provided, through which the oil in its passage is finely sprayed by the steam and thoroughly mixed with it.

In Fig. 5 the inner chamber of the throttle-nozzle 8ᵇ is conically enlarged in front of the narrow perforation 15 and provided with grooves on its inner walls at 14ª and a core—for instance, a ball 17 of suitable diameter—inserted in such a way that a number of small apertures or passages are formed in the interior of the nozzle-casing, through which apertures the flowing oil is finely distributed and uniformly mixed with the steam also flowing through these apertures.

Figs. 6 and 7 show forms of construction of the oil-distributer in which the insertion or core 17ª, instead of being spherical, is conical in shape and corresponds in shape to the shape of the inner recess of the nozzle 8ᶜ. The narrow passages 14ᵇ are also here formed by grooves, which in the form of construction shown in Fig. 6 are provided on the inner walls of the nozzle 8° and in Fig. 7 on the periphery of the conical core.

Figs. 8 to 10 show oil-distributers, in which the insertions have the form of boxes or nozzles 20, which are of smaller diameter than the oil pipe or passage, and one flange 18 of which fits on the inner wall of the throttle-nozzle 8ᵈ in front of the narrow perforation 15ᵃ and is provided with passage 14ᶜ.

Finally, Figs. 11 to 14 show some further forms of construction of oil-distributers, in which the narrow passages are not arranged in separate insertions in the throttle-nozzle, but are formed directly in this nozzle itself. In Fig. 11 the perforations or narrow passages 14ᵈ, provided directly in the throttle-nozzle 8ᵉ, radiate or converge toward the lubricating-place or in such a way that they extend into the narrow passage 15ᵇ or proceed therefrom in a reverse direction and extend radiatingly toward the meeting-place of the oil and the steam. Instead of opening into the narrow perforation of the throttle-nozzle these narrow passages 14ᵉ may also directly open onto the side of the nozzle 8ᶠ, facing the lubricating-place in the oil and steam mixing pipe, as shown in Fig. 12, or the passages 14ᶠ may be formed in the end of the nozzle 8ᵍ and extending in the latter parallel to one another and standing in communication with the narrow perforation 15ᶜ by means of an intermediate space 19, provided in the interior of the nozzle, as shown in Fig. 13. Finally, the throttle-nozzles 8ʰ may also themselves have at the end facing the meeting-place of the steam and oil a slot-shaped perforation 14ᵍ, as shown in Fig. 14, serving as a narrow passage-way to the nozzle-perforation 15ᵈ. Instead of one such slot several may also be provided, arranged crosswise to one another or in any other suitable manner.

Having now described my invention, what I claim as new, and desire to secure by Letters Patent, is—

1. In a lubricator, the combination with a sight-feed displacement-chamber for the oil and a source of steam-supply, of a throttling discharge-nozzle arranged at the point of delivery for the steam and oil, and an oil-distributing device interposed between said nozzle and the outlet from said sight-feed displacement-chamber.

2. In a lubricator an oil-feeding displacement-chamber, a condenser for supplying water of condensation and in communication with a source of steam-supply, a throttling discharge-nozzle arranged at the point of delivery for the mixture of oil and steam, a separate oil-distributing device interposed between said nozzle and the outlet for oil from said displacement-chamber, and means for conducting steam directly from the condenser to said separate oil-distributing device.

3. In a lubricator, the combination with an oil-feeding displacement-chamber and a condenser in communication with a source of steam-supply, of a throttling discharge-nozzle arranged at the delivery-port of the apparatus and having an impact-face with constricted passages therethrough, a separate oil-distributing device interposed between said nozzle and the outlet for oil from said displacement-chamber, and means for conducting steam directly from the condenser to said distributing device and through the nozzle.

4. In a lubricator, an oil-feeding displacement-chamber having a separate closed steam-chamber provided with independent passages one above the other and respectively receiving oil from the displacement-chamber, and for discharging water of condensation into the latter from the steam-chamber, a condenser for applying water of condensation to the main oil-reservoir, a throttling discharge-nozzle arranged at the delivery-port of the apparatus, and means for conducting steam directly from the condenser to said steam-chamber and through the nozzle.

In witness whereof I have hereunto set my hand in presence of two witnesses.

WILHELM MICHALK.

Witnesses:
CHEMNITZ H. SCHILLING,
PAUL ARRAS.